United States Patent
Cetin et al.

(10) Patent No.: US 7,894,531 B1
(45) Date of Patent: Feb. 22, 2011

(54) METHOD OF COMPRESSION FOR WIDE ANGLE DIGITAL VIDEO

(75) Inventors: Ahmet Enis Cetin, Ankara (TR); Mark Kenneth Davey, Bromley (GB); Halil I. Cuce, Ankara (TR); Andrea Elvis Castellari, Horley (GB); Adem Mulayim, Ankara (TR)

(73) Assignee: Grandeye Ltd., Guildford, Surrey (GB)

( * ) Notice: Subject to any disclaimer, the term of this patent is extended or adjusted under 35 U.S.C. 154(b) by 1380 days.

(21) Appl. No.: 11/355,262

(22) Filed: Feb. 15, 2006

Related U.S. Application Data (60) Provisional application No. 60/652,879, filed on Feb. 15, 2005.

(51) Int. Cl.
*H04N 11/04* (2006.01)

(52) U.S. Cl. ............................... 375/240.19; 375/240.2

(58) Field of Classification Search .............. 375/240.1, 375/240.03, 240.13, 240.16, 240.18, 240.19, 375/240.2; 382/232, 238, 248, 250
See application file for complete search history.

(56) References Cited

U.S. PATENT DOCUMENTS

| | | | |
|---|---|---|---|
| 3,725,563 A | 4/1973 | Woycechowsky | |
| 4,667,236 A | 5/1987 | Dresdner | |
| 4,728,839 A | 3/1988 | Coughlan et al. | |
| 4,763,280 A | 8/1988 | Robinson et al. | |
| 4,821,209 A | 4/1989 | Hempel et al. | |
| 5,027,287 A | 6/1991 | Artigalas et al. | |
| 5,122,873 A * | 6/1992 | Golin | 375/240.23 |
| 5,185,667 A | 2/1993 | Zimmermann | |
| 5,321,776 A | 6/1994 | Shapiro | |
| 5,359,363 A | 10/1994 | Kuban et al. | |
| 5,396,284 A | 3/1995 | Freeman | |
| 5,434,617 A | 7/1995 | Bianchi | |
| 5,495,292 A | 2/1996 | Zhang | |
| 5,666,157 A | 9/1997 | Aviv | |
| 5,684,937 A | 11/1997 | Oxaal | |
| 6,049,281 A | 4/2000 | Osterwell | |
| 6,147,709 A | 11/2000 | Martin et al. | |
| 6,243,099 B1 | 6/2001 | Oxaal | |
| 6,344,852 B1 | 2/2002 | Zhu | |

(Continued)

FOREIGN PATENT DOCUMENTS

| | | | |
|---|---|---|---|
| EP | 1341383 A2 * | 9/2003 | |
| WO | WO 02/062056 A1 * | 8/2002 | |

OTHER PUBLICATIONS

Comaniciu, D., Ramesh, V., and Meer, P., "Real-Time Tracking of Non-Rigid Objects Using Mean-shift," IEEE Computer Vision and Pattern Recognition, vol. 1 II, 2000, pp. 142-149.

(Continued)

*Primary Examiner*—Don N Vo
(74) *Attorney, Agent, or Firm*—Robert Groover; Groover & Associates (57) ABSTRACT

A system and method for varying the level of detail encoded in a video. In a preferred embodiment, some regions of a wide-angle video scene are encoded in an almost lossless manner, while other regions are encoded with less detail. Regions of interest can be determined in many ways, including a priori, automatically in real time, or by the selection of human operators.

20 Claims, 7 Drawing Sheets

Compression of a block of pixels, $b_{n+1,m}$ in the RoI during the interframe data compression mode of an differential video encoder which does not support the cancellation of interframe coding. The block of pixels $b_{n,c}$ is a DC only encoded block. Effectively, intraframe compression is carried out in the RoI because the pixel values of $b_{n,c}$ are all equal to each other.

U.S. PATENT DOCUMENTS

| | | | |
|---|---|---|---|
| 6,509,926 B1 | 1/2003 | Mills et al. | |
| 6,724,421 B1 | 4/2004 | Glatt | |
| 6,757,434 B2 | 6/2004 | Miled et al. | |
| 6,763,068 B2 | 7/2004 | Oktem | |
| 2001/0031003 A1* | 10/2001 | Sawhney et al. | 375/240.14 |
| 2003/0128756 A1 | 7/2003 | Oktem | |
| 2007/0291838 A1* | 12/2007 | Kim et al. | 375/240.03 |
| 2008/0002768 A1* | 1/2008 | Lane | 375/240.12 |

OTHER PUBLICATIONS

Y. Yardimci, I. Yilmaz, A. E. Cetin, "Correlation Tracking Based on Wavelet Comain Information," Proceedings of SPIE vol. #5204, San Diego, Aug. 5-7, 2003.

A M. Bagci, Y. Yardimci, A. E. Cetin, "Moving Object Detection Using Adaptive Subband Decomposition and Franctional Lower-Order Statistics in Video Sequences," Signal Processing, 82 (12): 1941-1947, Dec. 2002.

C. Stauffer, W. Grimson, "Adaptive Background Mixture Models for Real-Time Tracking." Proc. IEEE CS Conf. on Computer Vision and Pattern Recognition, vol. 2, 1999, pp. 246-252.

"A System for Video Surveillance and Monitoring," in Proc. American Nuclear Society (ANS) Eighth International Topical Meeting on Robotics and Remote Systems, Pittsburgh, PA, Apr. 25-29, 1999 by Collins, Lipton and Kanade.

Aube, 12th International Conference on Automatic Fire Detection, 2001.

X. Zhou, R. Collins, T. Kanade, and P. Metes, "A Master-Slave System to Acquire Biometric Imagery of Humans at Distance", ACM International Workshop on Video Surveillance, Nov. 2003.

* cited by examiner

FIGURES

Figure 1: A wide angle camera (10) monitoring a large room. Shaded areas (20) are important regions of interest containing humans and moving objects. A and B represent two corners of the room, respectively and C represents the center of the room on the room floor.

Figure 2: A fisheye camera (30) capturing a 180 degree field of view in a room. Regions of Interest (RoI) (40) can be manually determined according to the height of a typical person to capture human face images as accurately as possible.

Figure 3: Flow diagram of the video encoding scheme based on MPEG 1 Video Encoder. Automatic ROI estimation module passes the location of RoI, and the index of the DC only encoded block to the MPEG 1 video encoder for each image frame. Automatic RoI Estimation module can be controlled manually as well. In the RoI, MPEG 1 video encoder cancels the interframe coding.

Figure 4: Flow diagram of the video encoding scheme based on MPEG 2 Video Encoder. Automatic ROI estimation module passes the location of RoI, and the index of the DC encoded block to the MPEG 2 video encoder for each image frame. Automatic RoI Estimation module can be controlled manually as well. In the RoI, MPEG 2 video encoder cancels the interframe coding.

Figure 5: Flow diagram of the video encoding scheme based on MPEG 4 Video Encoder. Automatic ROI estimation module passes the location of RoI, and the index of the DC encoded block to the MPEG 4 video encoder for each image frame. Automatic RoI Estimation module can be controlled manually as well. In the RoI, MPEG 4 video encoder cancels the interframe coding.

Figure 6: Flow diagram of the video encoding scheme based on the wavelet transform. Automatic ROI estimation module passes the location of RoI, and the index of the DC encoded block to the interframe wavelet video encoder for each image frame. Automatic RoI Estimation module can be controlled manually as well. In the RoI, the video encoder cancels the interframe coding.

Figure 7: Compression of a block of pixels, $b_{n+1,m}$ in the RoI during the interframe data compression mode of an differential video encoder which does not support the cancellation of interframe coding. The block of pixels $b_{n,c}$ is a DC only encoded block. Effectively, intraframe compression is carried out in the RoI because the pixel values of $b_{n,c}$ are all equal to each other.

Figure 8: Decompression of a block of pixels, $b_{n+1,m}$ in the RoI during the interframe data compression mode of a differential video encoder which does not support the cancellation of interframe coding: $D_{n+1,m}$ represents the DCT of $d_{n+1,m}$ and $B_{n,c}$ represents the DCT of $b_{n,c}$, respectively.

Figure 9: A crosssectional view of the room shown in Figure 1. 180 degree wide angle camera (10) is monitoring the room. Images of corners marked as A and B, respectively appear on the digital imaging array (100) of the camera (10) as A' and B', respectively. The image of the center C of the room appears as C' on the imaging array (100).

Figure 10: The image of the room in the imaging array (100) of the wide angle camera (10). Images of corners marked as A and B, respectively appear on the digital imaging array (100) of the camera (10) as A' and B', respectively. The image of the center C of the room appears as C' in the imaging array (100). Shaded area is the image of RoI (20) shown in Figure 1.

Figure 11: A manually determined Region of Interest (RoI) (50) in a fisheye image (60), whose pixels appear inside a circle in a rectangular imaging array (100). The RoI is the shaded region (50). This RoI is determined according to the height of a typical person to capture human face images as accurately as possible.

Figure 12: Another manually determined Region of Interest (RoI) (90) in a fisheye image (80), whose pixels appear inside a circle in a rectangular imaging array (100). The RoI is the shaded region (90). This RoI is determined with the assumption that unwanted objects can be left only some part of the room.

METHOD OF COMPRESSION FOR WIDE ANGLE DIGITAL VIDEO

CROSS-REFERENCE TO RELATED APPLICATIONS

This application claims priority from U.S. provisional patent application 60/652,879 filed Feb. 15, 2005, which is hereby incorporated by reference.

BACKGROUND OF THE INVENTION

1. Field of the Invention

The invention proposes a novel method of video encoding for video signal captured by wide angle cameras. From now on we will refer video signals captured by wide angle cameras as "wide angle video". The proposed video encoder can produce bit streams which are compatible with a wide range of video coding standard including the MPEG family of video compression standards.

2. Description of Prior Art

The U.S. provisional patent application Ser. No. 60/467,588, entitled "Multiple View Processing in Wide-Angle Video Camera," by Yavuz Ahiska (which is hereby incorporated by reference in its entirety) is an example of a camera system producing wide-angle video. Such camera systems are widely used in CCTV surveillance systems. Ordinary video encoding standards cannot effectively compress the video produced by such a camera system because a typical wide angle video contains not only regions of high interests but also large regions corresponding to sky, walls, floor etc carrying very little information. A standard video encoding system cannot give automatic emphasis to regions of interest (RoI) and cannot assign more bits per area to RoI's compared to non-RoI regions of the wide-angle video.

Image and video compression is widely used in Internet, CCTV, DVD systems to reduce the amount of data for transmission or storage. With the advances in computer technology it is possible to compress digital video in real-time. Recent image and video coding standards include JPEG (Joint Photographic Experts Group) standard, JPEG 2000 (ISO/IEC International Standard, 15444-1, 2000), MPEG (Moving Pictures Expert Group) family of Video coding standards (MPEG-1, MPEG-2, MPEG-4) etc. Above standards except J1?EG 2000 are based on discrete cosine transform (DCT) and on Huffman encoding of the quantized DCT coefficients. They compress the video data by roughly quantizing the high-frequency portions of the image and sub sampling the color difference (chrominance) signals. After compression and decompression the high frequency content of the image is generally reduced. The human visual system (HVS) is not very sensitive td modifications in color difference signals and details in texture which contribute to high-frequency content of the image. In MPEG-1 and MPEG-2 standards the concept of RoI its not defined. These video coding methods do not give any emphasis to certain parts of the image which may be more interesting compared to the rest of the image. Only MPEG 4 standard has the capability of handling regions of interest. But the boundary of each RoI has to be specified as a side information in the encoded video bitstream. This leads to a complex and expensive video coding system. Even in simple shape boundaries such as rectangules, and circles, the receiver has to produce an a 1 bit/pixel RoI mask. The size of the RoI mask can be as large as the entire image size. This may be a significant overhead in the compressed wide-angle video which may contain large RoIs. The present invention does not require any side-information to encode RoIs. It can not only provide MPEG 1 and MPEG 2 compatible bitstreams but also MPEG 4 compatible bitstreams which can be decoded by all MPEG 4 decoders. The recent JPEG 2000 standard which is based on wavelet transform and bit-plane encoding of the quantized wavelet coefficients provides extraction of multiple resolutions of an encoded image from a given JPEG 2000 compatible bitstream. It also provides Region-of-Interest (RoI) encoding which is an important feature of JPEG 2000. This lets the allocation of more bits in a RoI than the rest of the image while coding it. In this way, essential information of an image e.g., humans, and moving objects can be stored in a more precise manner than sky and clouds etc. But JPEG 2000 is basically an image coding standard. It is not a video coding standard and it cannot take advantage of the temporal redundancy in video. In non-RoI portions of a wide-angle video there is very little motion in general. Therefore, pixels in a non-RoI portion of an image frame at time instant n is highly correlated with the corresponding pixels at image frame at time instant n+1. The present intention has a differential encoding scheme at non-RoI portions of the video which drastically reduces the number of bits assigned to such regions containing very little semantic information.

Motion JPEG and Motion JPEG 2000 are video coding versions of the JPEG and JPEG 2000 image compression standards, respectively. In these methods plurality of image frames forming the video are encoded as independent images. They are called as intraframe encoders because the correlation between consecutive image frames is not exploited. Compression capability of JPEG and JPEG 2000 are not as high as MPEG family of compression standards in which some of the image frames are estimated from intraframe coded frames by taking advantage of the correlation between the image frames of the video. In addition, a boundary shape encoder is required at the encoder side and a shape decoder at the receiver. The boundary information is preferably transmitted to the receiver as side information. The decoder has to produce the RoI mask defining the coefficients needed for the reconstruction of the RoI (see Charilaos Christopoulos (editor), ISO/11-:C 'TTCIISC29/WG1 N988 JPEG 2000 Verification Model Version 2.0/2.1, Oct. 5, 198) (which is hereby incorporated by reference in its entirety). Obviously, this increases the computational complexity and memory requirements of the receiver. It is desirable to have a decoder as simple as possible. The present invention does not require any side information transmission to the receiver to encode RoIs.

The US patent with; U.S. Pat. No. 6,757,434 by Miled and Chebil entitled "Region-of-interest tracking method and device for wavelet-based video coding," (which is hereby incorporated by reference in its entirety) describes an RoI tracking device for wavelet based video coding. This system cannot be used in DCT based video compression systems. However, the present invention can be used in both DCT and wavelet based video coding systems. Also, the RoI information is provided to the receiver as side information in the US Patent with U.S. Pat. No. 6,757,434 (which is hereby incorporated by reference in its entirety).

Another problem with ordinary video encoders is that when there is a buffer overflow or transmission channel congestion problem they uniformly increase the quantization levels over the entire image to reduce the amount of transmitted bits. On the other hand, this may produce degradation even the loss of very important information in RoIs in wide angle surveillance videos. The present invention first increases the quantization levels in non-RoI regions of the video. If the channel congestion gets worse then, it throws away the AC coefficients of the non-RoI blocks and represents them using only their DC coefficients. If this bit rate reduction is not enough then it increases the quantization levels of the RoI blocks as a last choice. In other words, essential information in RoIs of the image is kept as accurate as possible in the case of a buffer overflow or channel congestion.

In the US Patent with U.S. Pat. No. 6,763,068, entitled "Method and apparatus for selecting macroblock quantization parameters in a video encoder," dated Jul. 13, 2004 (which is hereby incorporated by reference in its entirety) and the US patent application with number 20030128756, entitled "Method and apparatus for selecting macroblock quantization parameters in a video encoder," dated Jul. 10, 2003 (which is hereby incorporated by reference in its entirety), L. Oktem describes a system adjusting the quantization parameters in an adaptive manner in RoIs. In RoIs quantization parameter is reduced to accurately represent the RoI. However, patents fail to cancel the interframe prediction process in RoIs to further increase the representation quality of the RoIs in a video. Furthermore, the system is not designed for wide angle video.

A number of video compression methods and standards allow the variation of quantization parameters during compression of different portions of the video image frames in order to achieve a target bit rate independent of the content of the source video frame sequence. The disclosed invention differs from those methods because the compression rate is varied according to the content of the video to increase the quality of representation of the RoI in the compressed data domain and a region of interest (RoI) detection algorithm analyzes the image content and allocates more bits to regions containing useful information by increasing the number of quantization parameters and canceling the interframe coding in RoIs_ It is possible to allocate more bits to certain parts of the image compared to others by changing the quantization rules.

SUMMARY OF THE INVENTION

Wide angle surveillance is necessary in many Closed Circuit Television (CCTV) applications. Dome cameras, cameras with fisheye lenses produce wide-angle video. Current digital video recording systems use wavelet data compression or (Discrete Cosine Transform) DCT based MPEG video compression standards to compress wide-angle video which are developed for coding ordinary video. One can take advantage of the nature of the wide-angle video judiciously allocate more bits to important regions of the scene compared to regions which contain little information e.g., blue sky, clouds, floor or room etc. In an example embodiment of the present innovations, a video coding method and a system for wide angle video is presented. The method and the system preferably encodes some regions of the scene in an almost lossless manner. Such regions can be determined a priori or they can be automatically determined in real-time by an intelligent system determining the existence of motion and humans within a certain window of the wide angle fisheye image. It is important to represent biometric properties of humans as accurately as possible during data compression. The user can preferably set high priority in such regions a priori or the intelligent video analysis algorithm automatically assigns some windows of the video higher priority compared to the rest of the video. In a typical differential video coding scheme, including MPEG family of video compression standards, there are Intraframe compressed frames (I-type), and Predicted (P-type) and Bidirectionally predicted (B-type) frames, which are estimated from I-type frames. In important regions prediction operation is preferably not carried out by nulling the motion estimation or compensation operation and decreasing size of the quantization levels during the encoding process. The method and the system has the capacity to produce MPEG compatible bitstreams.

DETAILED DESCRIPTION OF THE PREFERRED EMBODIMENT

Figure 1:
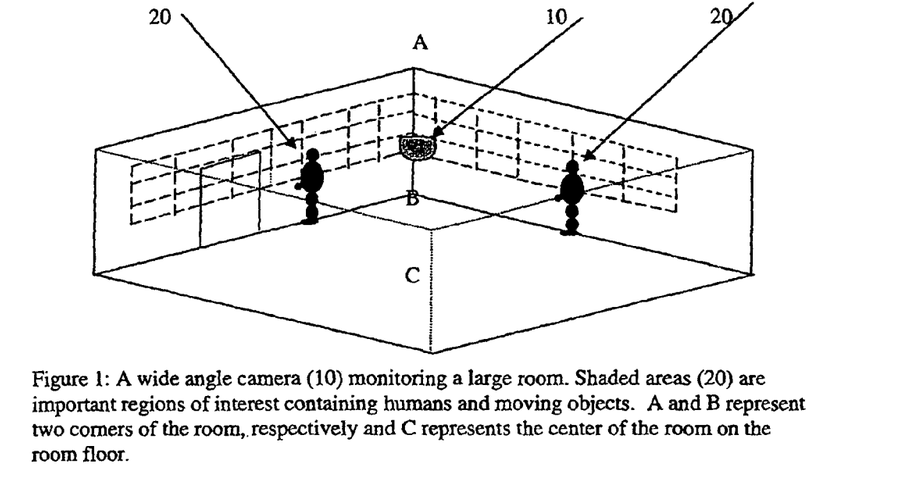
FIG. 1: A wide angle camera (10) monitoring a large room. Shaded areas (20) are important regions of interests containing humans and moving objects. A and B represent two corners of the room, respectively and C represents the center of the room on the room floor.
Figure 2:
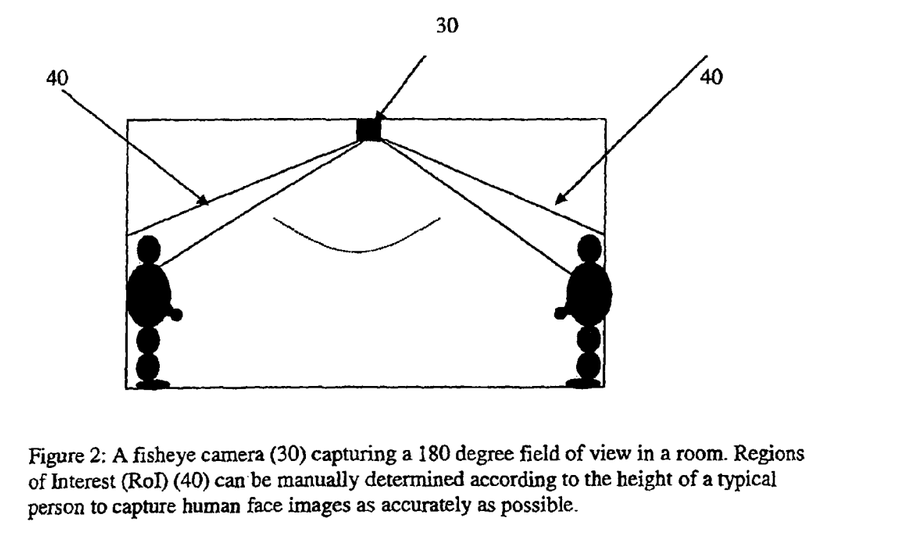
FIG. 2: A fisheye camera (30) capturing a 360 degree field of view in a room. Regions of Interests (RoI) (40) can be manually determined according to the height of a typical person to capture human face images as accurately as possible.

Wide angle surveillance is necessary in many Closed Circuit Television (CCTV) applications. Dome cameras, cameras with fisheye lenses produce wide-angle video. Current digital video recording systems use vector quantization, wavelet data compression or Discrete Cosine Transform (DCT) based MPEG video compression standards to encode wide-angle video which are developed for coding ordinary video. In this invention, a video encoding scheme especially designed for compressing wide-angle video captured by a fixed camera is described. Such a camera system is defined in the US provisional patent application Ser. No. 60/467,588, entitled "Multiple View Processing in Wide-Angle Video Camera," By Yavuz Ahiska (which is hereby incorporated by reference in its entirety). In FIG. 1 a wide angle camera (10) monitoring a large room is shown. Shaded areas (20) are important regions of interests containing humans and moving objects. Such RoIs can be automatically initiated by the present invention. In FIG. 2, another fisheye camera (30) capturing a 360 degree field of view in a room is shown. Regions of Interests (RoI) (40) can be also manually determined according to the height of a typical person to capture human face images as accurately as possible. In one example embodiment, the idea is to assign more bits per area to RoIs compared to non-RoIs to achieve a semantically meaningful representation of the wide angle video. In preferred embodiments of the present innovations, example implementations judiciously allocate more bits per area to regions of wide angle video containing useful information compared to the non-RoI regions. The system and the method can also preferably compress the video captured by an ordinary camera as well.

Review of Differential Video Coding Methods: A raw digital video consists of plurality of digital image frames, and there is high correlation between the consecutive image frames in a video signal. In a typical differential video coding scheme, including MPEG family of video compression standards, there are Intraframe compressed frames (I-type), and Predicted (P-type) frames and Bi-directionally predicted frames (B-type), which are estimated from I-type image frames. MPEG encoders transmit encoded I-type frames, and prediction vectors and difference images for P-type, and B-type frames.

In a typical video consecutive image frames are highly related with each other. For example, if there is no moving object in the scene and the camera is fixed then the image frame In at time instant n should be the same as the next frame of the video $I_{n+1}$ in the absence of camera noise. Based on this fact, it is advantageous to differentially encode the image sequence. Let the difference image $D_{n+i}$ be defined as follows $$D_{n+1}=I_{n+1}-I_n$$

In many video encoding schemes the current image $I_n$ and the difference image $D_{n+1}$ are compressed instead of In and $I_{n+1}$ pair of images. Since the dynamic range of a typical pixel in $D_{n+1}$ is much smaller than the dynamic range of pixels in $I_n$ and $I_{n+1}$. Thus it is better to encode $D_{i+1}$ instead of $I_{n+1}$. It is said that In is compressed intraframe only (I-type frame) and $I_{n+i}$ is compressed in a predictive manner (P-type frame).

If there is a moving object in the scene or camera moves at time instant n then straightforward differencing may not produce good results around the moving object. In this case, the difference image is defined as follows $$D_{n+1}=I_{n+1}-G(I_n)$$

where G(.) is a time-varying function compensating the camera movement, and moving regions. The decoder reconstructs the image $I_{n+1}$ from $D_{n+1}$ and In according to the function G(.). In a block based video coding scheme, including MPEG family of compression schemes, image frames are divided into small non-overlapping square blocks of pixels. Usually, the block size is 8 by 8 and the differencing operation is carried out block by block. Let the current block be $b_{n,m}$ and the corresponding block in image $I_{n+1}$ be $b_{n+1,m}$. If both $b_{n,m}$ and $b_{n+1,m}$ are part of the background of the scene then the corresponding difference block in the image $D_{n+1}$ is equal to $$D_{o+i,m}=b_{n+i,m}-b_{n,m}$$

which contains zero valued pixels or pixels with values close to zero due to noise. If the block $b_{n+i,m}$ is part of a moving object and the block $b_{n,m}$ is part of the background (or vice versa) then differencing these two blocks will be meaningless. However, $b_{n+1,m}$ can be predicted from the corresponding block $b_{n,p}$ on the moving object. In this case the difference block is defined as $$d_{n+i,m}=b_{n+i,m}-b_{n,p}$$

The vector $v_{n,m}$ from the center (or upper-left corner) of the block $b_{n,r}$ to the center (or upper-left corner) of $b_{n,m}$ is defined as the motion vector of the m-th block. Motion vectors uniquely define the motion compensation function G(.) defined above. The video encoder has to transmit the motion vectors in addition to the difference blocks to the decoder to achieve reconstruction.

Estimation of block motion vectors can be carried out using the current and the previous image frames of the video as well. In fact, in MPEG based video coding algorithms the motion vector of a given 8 by 8 image block in the current frame is computed with respect to the previous frame. A block similar to the given block of the current image frame is searched in the previous frame. Various similarity measures including Euclidian distance and mean absolute difference are used for comparing blocks of the current frame with the blocks of the previous video image frame. Once such a block is found then the motion vector is computed as described above.

In a real-time video encoding system the motion vector estimation may not be very accurate. Motion vector estimation in the face image of a person may produce severe artifacts and this may lead to errors in manual or automatic human identification and recognition process which can be carried out in real-time or off-line. Therefore, in Regions of Interest (RoI) it is wiser to cancel the motion estimation-compensation process in an automatic manner and simply compress the original image pixels. In other words, an image data block in a region of interest is represented as, $$d_{n+1,m}=b_{n+1,m}$$

Intraframe coding is allowed in macroblock level in MPEG type algorithms. A macroblock consists of four 8×8 blocks or 16×16 pixels in the luminance image frame and the corresponding chrominance image blocks. In 4:1:1 sub-sampling format 8×8 pixels in U and V domain correspond to said 16×16 luminance pixels. Therefore, in MPEG family of algorithms interframe coding is simply cancelled in our invention in macroblocks forming the RoI. If the video coding method does not allow macroblock level modifications then the fol lowing then the following strategy can be implemented: An image data block in an RoI can be also represented as $$d_{n+1,m} = b_{n+1,m} - b_{n,c}$$

where $b_{n,c}$ represents a block whose pixel values are equal to a constant. The AC coefficients of the DCT of $b_{n+1,m}$ and $b_{n+1,m} - b_{n,c}$ are the same because the DCT is a Fast Fourier Transform-like transform. The motion estimation process is effectively cancelled in an RoI by performing the DCT of all the blocks $b_{n+1,-n}$ in the RoI or equivalently by performing the DCT of $b_{n+1,m} - b_{n,c}$. We call this video coding strategy effective intraframe compression because of the fact that blocks are basically intraframe compressed in spite of differencing of two blocks one from the n-th frame and the other from the n+1'st frame of the video.

Embodiments of the present innovations preferably identify an image block with almost constant values outside the region of interest. Such blocks exists in portions of the image containing the sky or walls of a room in indoor scenes etc. A block with almost constant pixel values can be represented using its DC value only representing the average pixel value of the block. No AC coefficient is used to encode this block. Examples of the present encoder define the motion vector of a block in the region of interest with respect to said block which is encoded using only its DC value. The motion vector $v_{n,m}$ of the block $b_{n,m}$ is defined as the vector from the center (or upper-left corner) $b_{n,m}$ to the center (or upper-left corner) $b_{n,c}$ representing a block whose values are only DC encoded. In other words, motion estimation or motion compensation process is not implemented in the RoI. A motion vector whose length and angle is determined with respect to a DC encoded block outside the RoI is simply assigned to each block in the RoI. In MPEG family of image coding standards there is no limit on the length of the motion vectors. Therefore, the motion vector can be accurately encoded without having any representation problem. Motion vectors of neighboring blocks are differentially encoded. This means that motion vectors of blocks in an RoI will be effectively encoded as they are very close to each other in length and angle.

MPEG like differential video encoding schemes allow the use of several quantizers or they allow to have variable quantization steps during the representation of DCT domain data to overcome buffer or transmission channel overflow problems. Quantization levels can be changed at the macroblock level in MPEG 2 and MPEG 4. In some example embodiments of this invention, we take advantage of this feature to finely quantize the AC coefficients of blocks in the RoI. This is also a second way of giving emphasis to the RoI because the image blocks in the RoI is more accurately encoded by finely quantizing them. This also means that more bits are assigned to an image block in the RoI compared to an ordinary image block which is coarsely quantized in general. In most video encoding methods the quantized transform domain data is represented in binary form using either Huffman coding or arithmetic coding. The use of Huffman coding or arithmetic coding does not effect our embedded RoI representation method because RoI information is embedded into artificially defined motion vectors. In MPEG family of differential video coding methods motion vectors are separately encoded. Artificially defined motion vectors by our invention are not different from any other motion vector defined according to actual motion therefore they can be also represented in binary form using Huffman coding or arithmetic coding without effecting our RoI representation scheme.

An important feature of this approach is that no side information describing the RoI has to be transmitted to the receiver. Because, the RoI information is embedded into the bitstream via artificially defined motion vectors. The receiver does not have to change its operating mode from interframe decompression to intraframe decompression to handle the RoI whose boundary information is embedded into the bitstream by using motion vectors defined with respect to a DC encoded block outside the RoI. If an image frame is intraframe compressed then the decoder mode the decoder performs as usual. If an image frame is intraframe compressed then the decoder performs interframe decompression but the decoder actually performs intraframe operation in the RoI because a block in the RoI can be expressed as $$b_{n+1,m} = d_{n+1,m} + b_{n,c}$$

where $b_{n,}$ represents a block whose pixel values are constant. Therefore, any MPEG decoder can also decode the bitstream generated by this invention. The concept of RoI is defined only in MPEG-4 standard. The MPEG-4 encoders which have the capability of RoI representation generate a bit stream containing not only the encoded video data information but also an associated side information describing the location and the boundary of RoI's in the video. The concept of RoI is not defined in MPEG-1 and MPEG-2 video compression standards. Therefore, this invention provides RoI capability to MPEG-1 and MPEG-2 video compression standards.

Some MPEG-4 decoder implementations always assume there is no RoI in the bitstream and they cannot decode bitstreams containing RoI's. Even such simple MPEG-4 video decoders which cannot handle RoIs to decode bitstreams generated by the encoder of this invention which transmits or stores video without any side-information describing the RoI.

Figure 3:
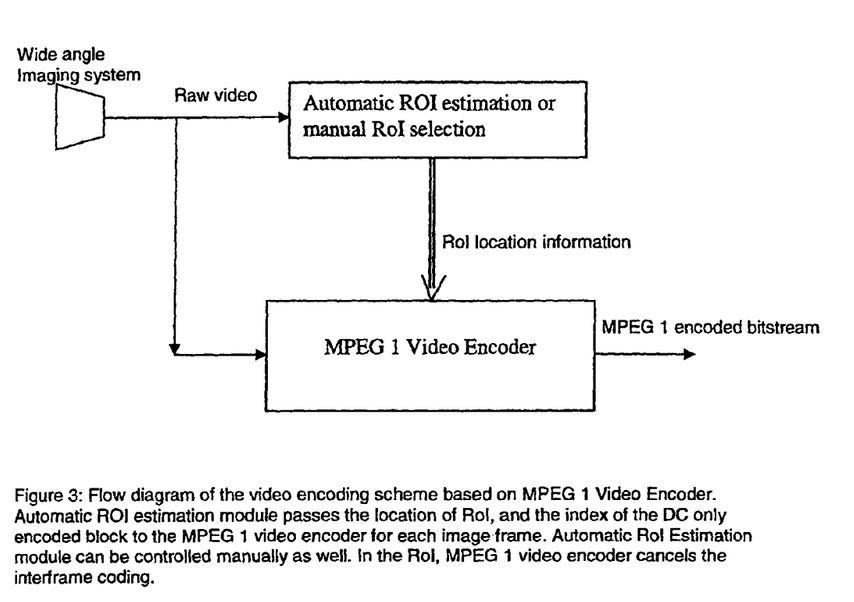
FIG. 3: Flow diagram of the video encoding scheme based on MPEG 1 Video Encoder. Automatic ROI estimation module passes the location of RoI, and the index of the DC only encoded block to the MPEG 1 video encoder for each image frame. Automatic RoI Estimation module can be controlled manually as well. In the RoI, MPEG 1 video encoder nulls the interframe coding.
Figure 4:
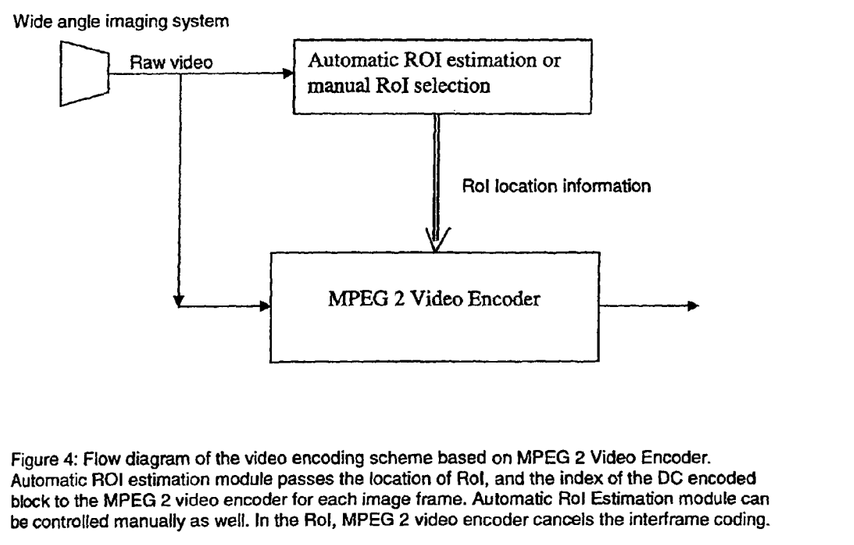
FIG. 4: Flow diagram of the video encoding scheme based on MPEG 2 Video Encoder. Automatic ROI estimation module passes the location of RoI, and the index of the DC encoded block to the MPEG 2 video encoder for each image frame. Automatic RoI Estimation module can be controlled manually as well. In the RoI, MPEG 2 video encoder nulls the interframe coding.
Figure 5:
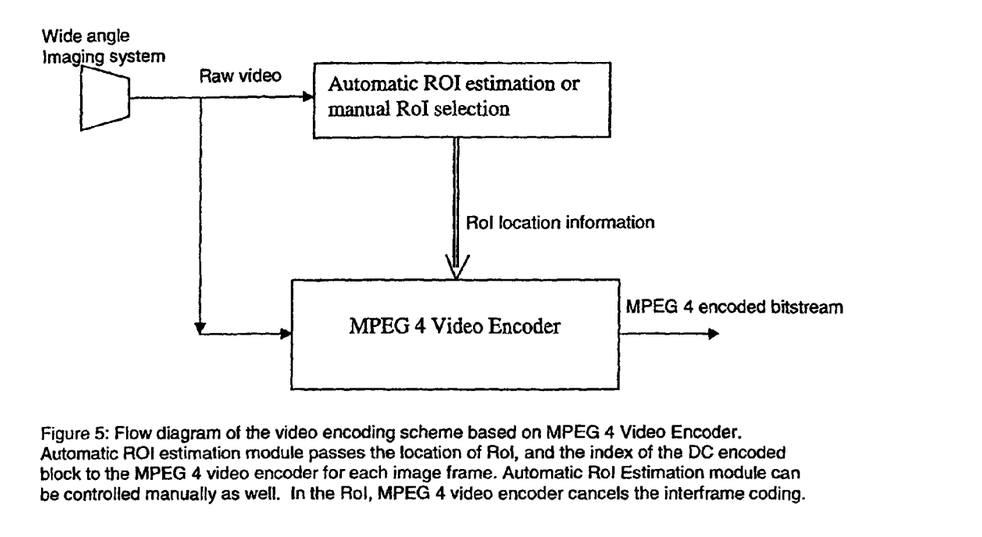
FIG. 5: Flow diagram of the video encoding scheme based on MPEG 4 Video Encoder. Automatic ROI estimation module passes the location of RoI, and the location of the DC encoded block to the MPEG 4 video encoder for each image frame. Automatic RoI Estimation module can be controlled manually as well. In the RoI, MPEG 4 video encoder nulls the interframe coding.

In FIGS. 3, 4 and 5 flow diagram of the video encoding scheme based on MPEG 1, MPEG 2 and MPEG 4 video encoders are shown, respectively. Automatic ROI estimation module passes the location of RoI, and the index of the DC only encoded block to the video encoder for each image frame. Automatic RoI Estimation module can be controlled manually as well. In the RoI, video encoder nullifies the interframe coding. During intraframe compression mode of the MPEG encoder only the quantization levels are reduced to accurately represent the RoI in the video bitstream.

Figure 7:
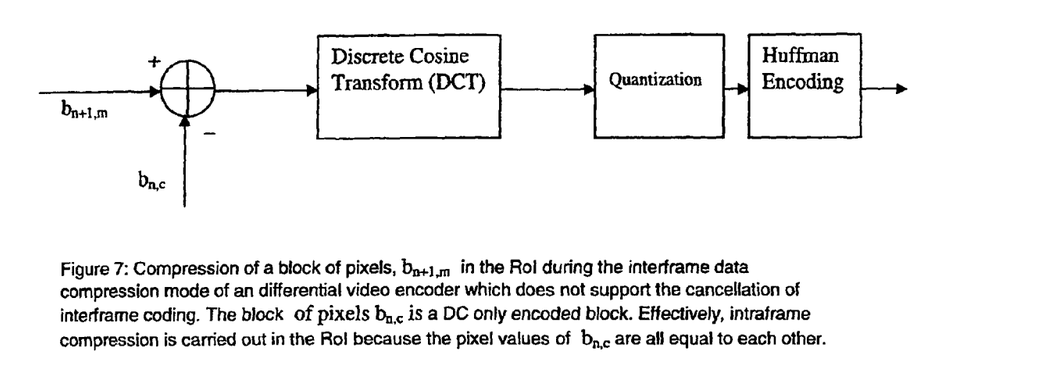
FIG. 7: Compression of a block of pixels, $b_{r+1,m}$ in the RoI during the interframe data compression mode of a differential video encoder which does not support the cancellation of interframe coding. The block of pixels $b_{n,c}$ is a DC only encoded block. Effectively, intraframe compression is carried out in the RoI because the pixel values of the block $b_{n,c}$ are all equal to each other.

In FIG. 7 compression of a block of pixels, $b_{n+1,m}$ in the RoI during the interframe data compression mode of differential video encoder which does not support the cancellation of interframe coding is shown. The block of pixels bn, is a DC only encoded block. Effectively, intraframe compression is carried out in the RoI because the pixel values of the block $b_{n,c}$ are all equal to each other.

Figure 8:
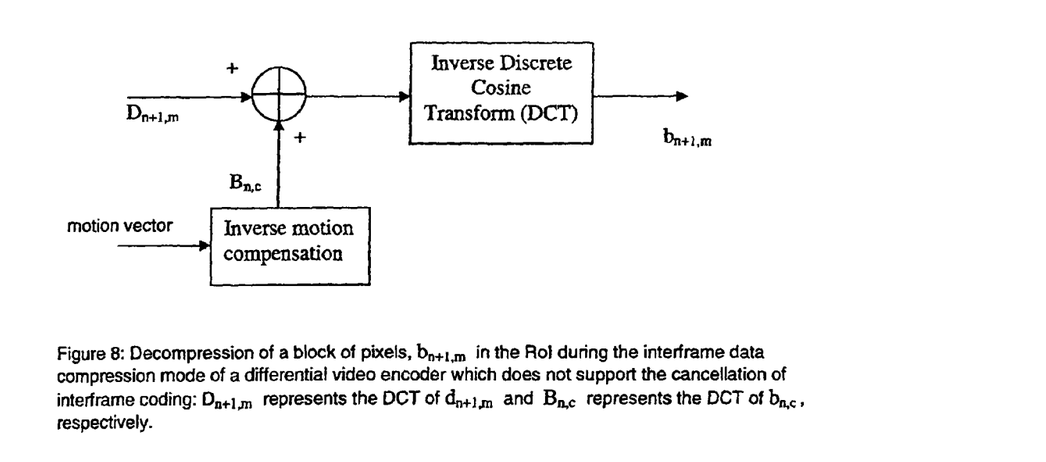
FIG. 8: Decompression of a block of pixels, $b_{n+1,m}$ in the RoI during the interframe data compression mode of a differential video encoder which does not support the cancellation of interframe coding: $D_{n+1,m}$ represents the DCT of $d_{n,1,m}$ and $B_{n,c}$ represents the DCT of $b_{n,c}$, respectively.

In FIG. 8 decompression of a block of pixels, $b_{n+1,m}$ in the RoI during the interframe data compression mode of a differential video encoder which does not support the cancellation of interframe coding is shown: $D_{n+1,n}$ represents the DCT of $d_{n,j,m}$ and Bn,c represents the DCT of $b_{n,c}$, respectively.

The above RoI encoding scheme is described for image frames predicted in one direction, however extension to Bidirectionaly predicted image frames (B-type frames) is straightforward.

Figure 6:
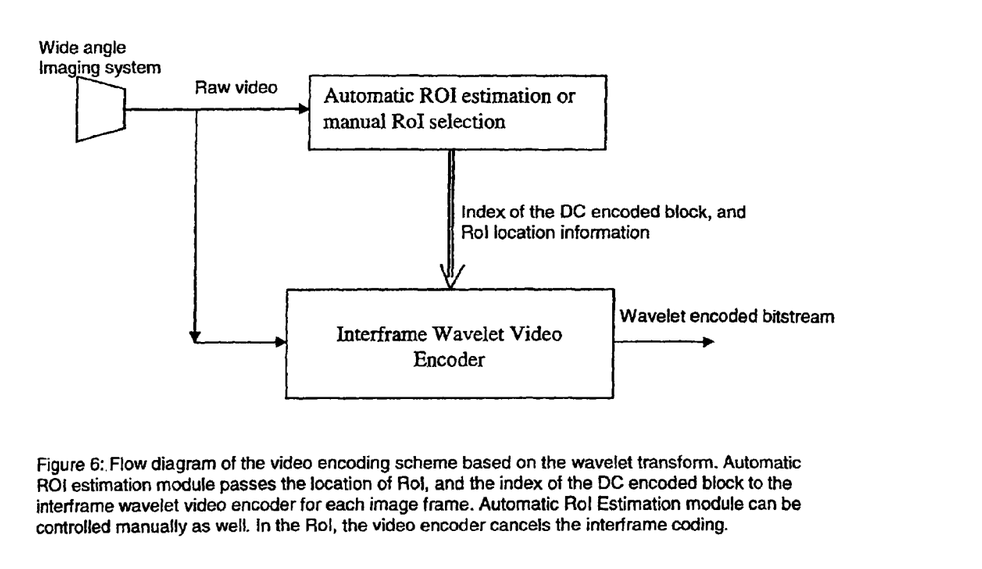
FIG. 6: Flow diagram of the video encoding scheme based on the wavelet transform. Automatic RoI estimation module passes the location of RoI, and the index of the DC encoded block to the interframe wavelet video encoder for each image frame Automatic RoI Estimation module can be controlled manually as well. In the RoI, the video encoder nulls the interframe coding.

The image data can (in some embodiments) be transformed into the transform domain using not only DCT but also other block transforms such as Haar, Hadarnard or Fourier transforms can be also used. In wavelet based video coding methods the entire image or large portions of the image are transformed into another domain for quantization and binary encoding. Some wavelet based video coding methods also use block motion vectors to represent the motion information in the video. Some embodiments of the present invention can provide an RoI representation for such differential wavelet video coding methods by artificially defining motion vectors in an RoI with respect to a constant valued image block outside the RoI or with respect to an non-RoI image block whose values are forced to take a constant value. In FIG. 6 the flow diagram of the video encoding scheme based on the wavelet transform is shown. Automatic ROI estimation module passes the location of RoI, and the index of the DC encoded block to the interframe wavelet video encoder for each image frame. Automatic RoI Estimation module can be controlled manually as well. In the RoI, the video encoder nullifies the interframe coding. During intraframe compression mode of the wavelet video encoder only the quantization levels are reduced to accurately represent the RoI in the video bitstream.

Image pixels can be represented in any color representation format including the well-known Red, Green and Blue (RGB) color space and luminance (or gray scale) and chrominance (or color difference) color space (YUV). A DC only color encoding of an image block means that only the average value (or a scaled version of the average value) of each color channel is stored in the memory of the computer or transmitted to the receiver for this block.

Automatic RoI Estimation: The method and the system has a built-in RoI estimation scheme based on detecting motion and humans in video. In FIG. 1, a wide angle camera (10) monitoring a large room is shown. Shaded areas (20) are important regions of interests containing humans and moving objects.

Motion and moving region estimation in video can be carried out in many ways. If the camera is fixed then any video background estimation based method can be used used to determine moving regions. In wide angle surveillance systems including the method and the system described in the U.S. provisional patent application Ser. No. 60/467,588, entitled "Multiple View Processing in Wide-Angle Video Camera," By Yavuz Ahiska the camera is placed to a location which is suitable to screen a wide area. The method and the system first segments each image frame of the video into foreground and background regions using the RGB color channels of the video or using the YUV channels. Foreground-background separation in a video can be achieved in many ways (see e.g. GMM give reference here). The background of the scene is defined as the union of all stationary objects and the foreground consists of transitory objects. A simple approach for estimating the background image is to average all the past image frames of the video. The article "A System for Video Surveillance and Monitoring," in Proc. American Nuclear Society (ANS) Eighth International Topical Meeting on Robotics and Remote Systems, Pittsburgh, Pa., Apr. 25-29, 1999 by Collins, Lipton and Kanade (which is hereby incorporated by reference in its entirety) describes a recursive background estimation method in which the current background of the video is recursively estimated from past image frames using Infinite-duration Impulse Response (IIR) filters acting on each pixel of the video in a parallel manner. A statistical background estimation method is described in the article by C. Stauffer et al., "Adaptive background mixture models for real-time tracking," IEEE Computer Vision and Pattern Recognition Conference, Fort Collins, Colo., June 1999 (which is hereby incorporated by reference in its entirety). Pixels of the foreground objects are estimated by subtracting the current image frame of the video from the estimated background image. Moving blobs are constructed from the pixels by performing a connected component analysis, which is a well-known image processing technique (see e.g., Fundamentals of Digital Image Processing by Anil Jain, Prentice-Hall, N.J., 1988) (which is hereby incorporated by reference in its entirety).

Each moving blob and its immediate neighborhood or a box containing the moving blob in the current frame of the video can be defined as an RoI and image blocks forming the moving blob are effectively compressed intraframe using artificially defined motion vectors as described above even in interframe encoded frames of the video. Also, image blocks of the RoI are finely quantized in the transform domain compared to non-RoI blocks to increase the quality of representation.

RoI's can be also defined according to humans in the screened area. Because the face, height, or posture of a person or an intruder carries important information in surveillance applications. In fact, most of the semantic information in videos is related to human beings and their actions. Therefore, an automatic RoI generation method should determine the boundary of the RoI in an image frame so that the human image(s) is (are) enclosed.

Due to its practical importance there are many public domain methods listed in the literature for human face and body detection, see e.g., the public domain document written by G. Yang and T. S. Huang, entitled "Human face detection in a complex background," published in the scientific journal, Pattern Recognition, 27(1):53-63, in 1994 (which is hereby incorporated by reference in its entirety) and the final report of the DARPA (Defense Advanced Research Projects Agency) funded project entitled "Video Surveillance and Monitoring (VSAM)," by R. T. Collins et al, Carnegie-Mellon University Technical Report with number CMU-RI-TR-00-12, published in 2000 (which is hereby incorporated by reference in its entirety), in which humans are detected in video from the shape and the boundary information of the moving blobs. In this method, contours describing the boundary of humans at various scales are stored in a database. These contours are extracted from some training videos manually or in a semi-automatic manner. Given a moving blob, its boundary is compared to the contours in the database. If a match occurs then it is decided that the moving blob is a human. Other contours stored in the database of the automatic RoI initiation method includes the contours of human groups, cars, and trucks etc.

Object boundary comparison is implemented by computing the mean-square-error (MSE) or the mean-absolute-difference (MAD) between the two functions describing the two contours. There are many ways of describing a closed contour using a one-dimensional mathematical function. For example, a function describing the object boundary can be defined by computing the length of object boundary from the center of mass of the object at various angles covering the 360 degrees in a uniform manner. In addition, color information is also used to reach a robust decision. For example, the color histogram of a car consists of two sharp peaks corresponding to the color of the body of the car and windows, respectively. On the other hand, the histogram of a human being usually has more than two peaks corresponding to the color of pants, the shirt, the hair, and the skin color.

This public domain human detection method is used to detect humans in video. After the detection of a human in a moving blob an RoI covering the moving blob is initiated and the RoI is compressed in an almost lossless manner by using fine quantization levels in the transform domain and intraframe compression throughout its existence in the video.

Some embodiments also detect human faces by convolving the luminance component of the current image frame of the video with human face shaped elliptic regions. If a match occurs then the mathematical convolution operation produces a local maximum in the convolved image. Smallest elliptic region fits into a 20 pixel by 15 pixel box. Most automatic human detection algorithms and humans can start recognizing people, if the size of a face is about 20 pixel by 15 pixel. After detecting a local maximum after convolution operation the actual image pixels are checked for existence of local minima corresponding to eyes, eye-brows and nostrils (it is assumed that black is represented by 0 in the luminance image). Since eyes, nostrils and eye-brows are relatively darker than pixels representing the face skin they correspond to local minimums in the face image. In addition, color information within the elliptic region is also verified. For example, a blue or a green face is impossible, i.e., if the blue and green values of pixels are significantly larger than the red value of pixels in the elliptic region than this region cannot be the face of a person.

After the detection of a human in the image an RoI covering the region is initiated even if the region does not move. If the region is inside a moving blob then this increases the possibility of existence of a human in the RoI. As described above the RoI is compressed in an almost lossless manner by using fine quantization levels in the transform domain and intraframe compression throughout its existence in the video.

Images of human beings and their faces may be distorted in a wide angle video (the reason behind the distortion is explained in detail in the next paragraph). Therefore, the human detection and the face detection algorithms can be implemented on the view corrected image frames of the video. The image frames generated by the camera can corrected as described in the US Patent Application by Y. Ahiska et al. with Ser. No. 60/467,705 entitled "Correction of optical distortion by image processing," (which is hereby incorporated by reference in its entirety). After the correction standard human face detection and human detection algorithms can be applied to automatically deter nine the RoIs.

Figure 9:
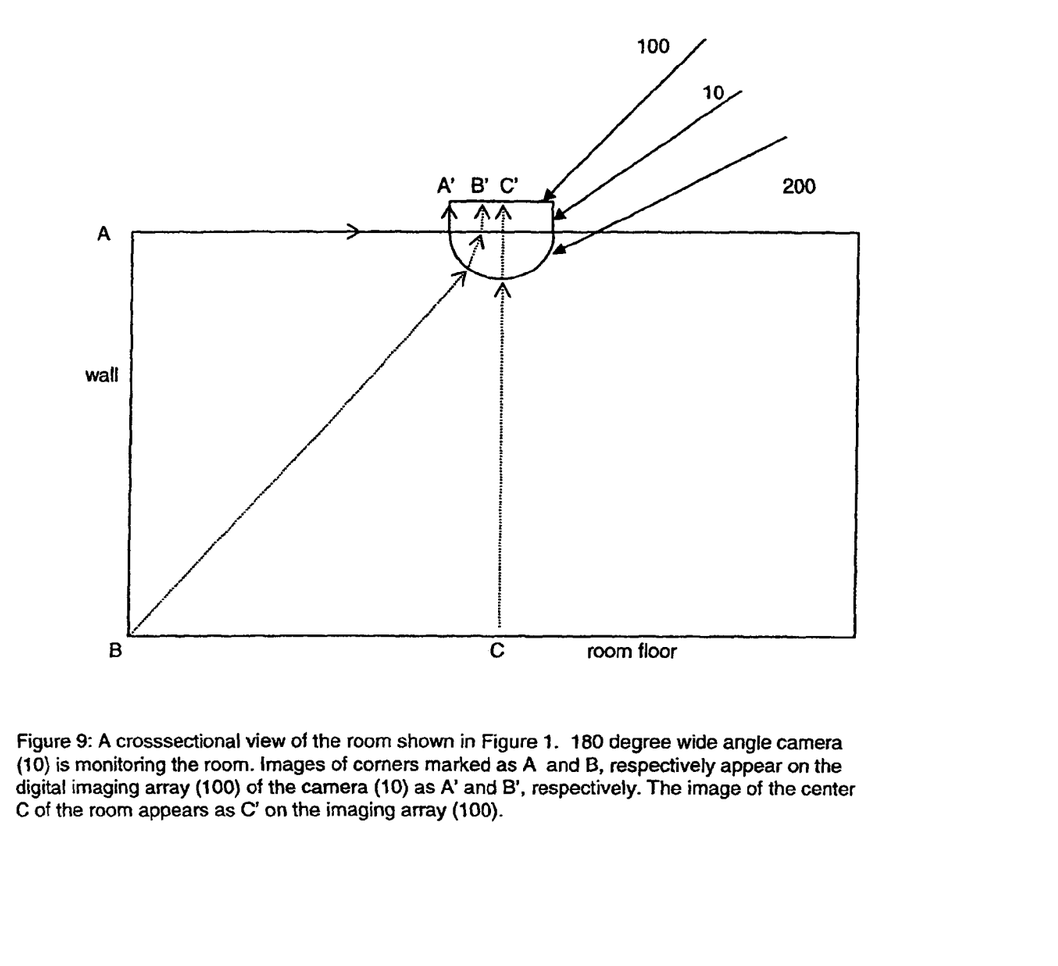
FIG. 9: A cross-sectional view of the room shown in FIG. 1. 180 degree wide angle camera (10) is monitoring the room. Images of corners marked as A and B, respectively appear on the digital imaging array (100) of the camera (10) as A' and B', respectively. The image of the center C of the room appears as C' on the imaging array (100).
Figure 10:
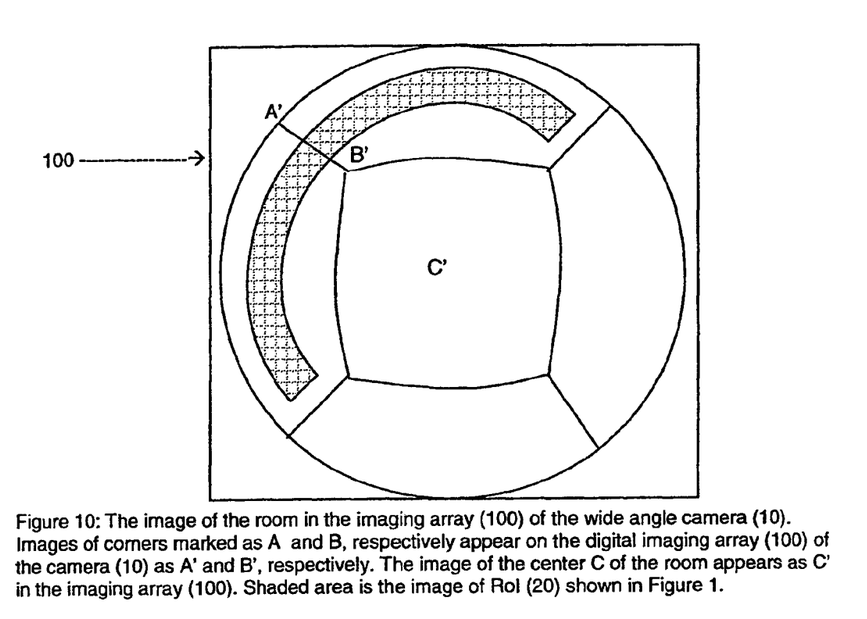
FIG. 10: The image of the room in the imaging array (100) of the wide angle camera (10). Images of corners marked as A and B, respectively appear on the digital imaging array (100) of the camera (10) as A' and B', respectively. The image of the center C of the room appears as C' in the imaging array (100). Shaded area is the image of RoI (20) shown in FIG. 1.
Figure 11:
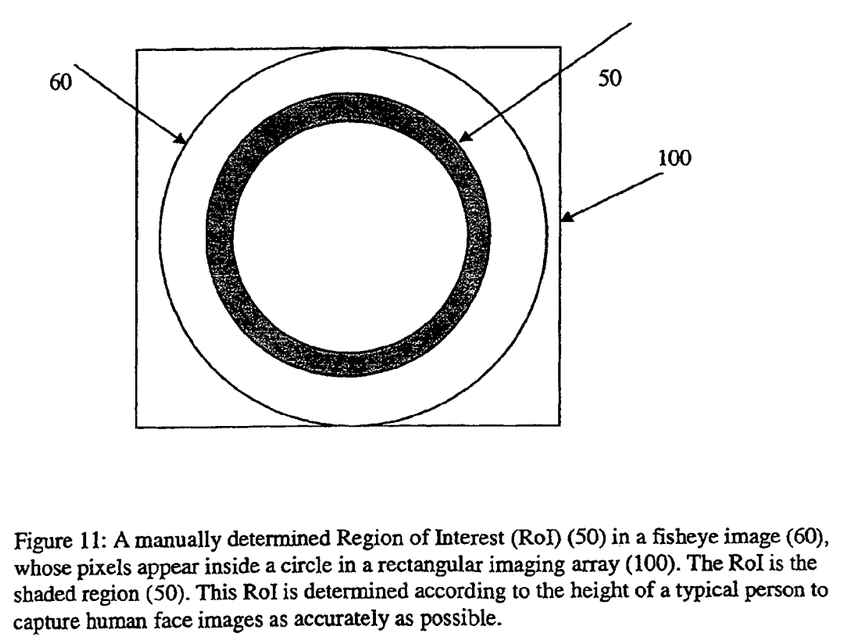
FIG. 11: A manually determined Region of Interest (RoI) (50) in a fisheye image (60), whose pixels appear inside a circle in a rectangular imaging array (100). The RoI is the shaded region (50). This RoI is determined according to the height of a typical person to capture human face images as accurately as possible.

Manual RoI Initiation: In a surveillance system employing a wide-angle camera the Rocs can be manually determined as well. In fact, it is possible to estimate possible regions in which humans or objects of interests can appear. Such regions can be manually selected as RoIs. If such a region is selected by an operator on the screen displaying the video then this region is compressed in an almost lossless manner by using fine quantization levels in the transform domain and effective intraframe compression during recording. In FIG. 2 a fisheye camera (30) capturing a 180 degree field of view in a room is shown. In FIG. 9, a cross-sectional view of a 180 degree wide angle camera monitoring a room is shown. The camera maps everything under itself in the room into a planar digital imaging array (100). If a uniform 180 degree lens is used in the camera then this lens maps the light rays entering the lens onto the planar imaging array in a uniform manner. Therefore, a semi-sphere is mapped onto a plane and a circular image is obtained as a result. An image captured by a 180 degree wide angle camera occupies the interior of a circle in the imaging array as shown in FIG. 10. As a result, Regions of Interest (RoI) on the wide angle video are bounded by curved regions. For example, the RoI (40) can be manually determined according to the height of a typical person to capture human face images as accurately as possible. In this case, the RoI (50) turns out to be bounded by two concentric circles in the raw digital image frame of a video captured by the 360 degree fisheye imaging system as shown in FIG. 11. A typical fisheye image is a circular image (60) that is why the RoI is bounded by two concentric circles (50). The circle with a smaller radius is determined according to the lower edge of a chin of 1.6 meter tall person. The circle with the larger radius is determined according to the hair of a 2.1 meter tall person.

Figure 12:
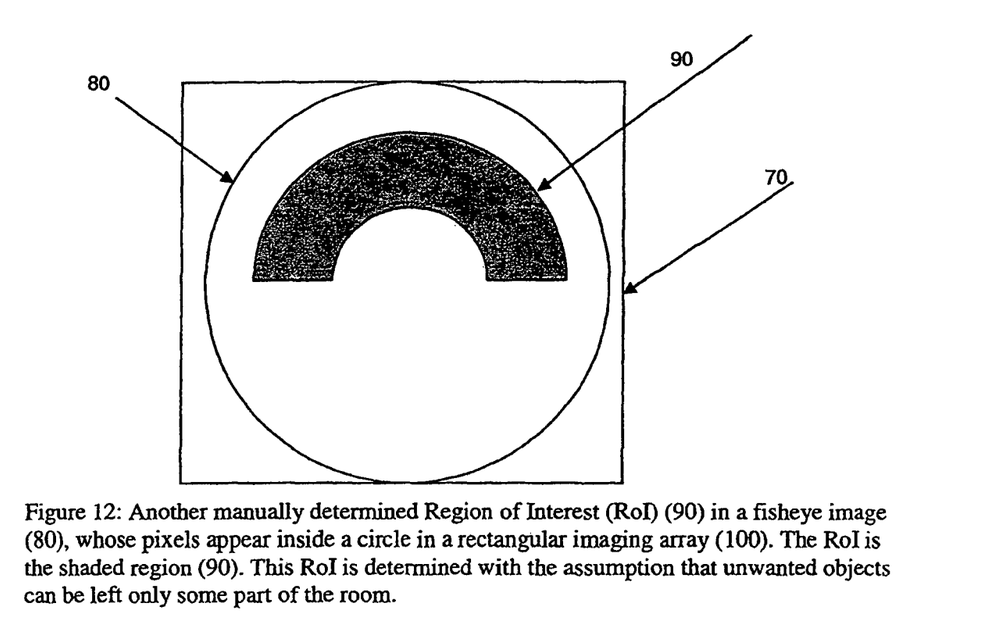
FIG. 12: Another manually determined Region of Interest (RoI) (90) in a fisheye image (80), whose pixels appear inside a circle in a rectangular imaging array (100). The RoI is the shaded region (90). This RoI is determined with the assumption that unwanted objects can be left only some part of the room.

RoIs can be determined according to the criterion of left objects or removed objects in some parts of the scene or room as shown in FIG. 12. If objects can be left or removed only from some parts of the monitored room then it is better to manually mark only those regions as RoI.

Manual region selection can be carried out in the distortion corrected wide angle video or raw video captured by the sensor array of the camera. The U.S. patent Applications with Ser. No. 60/467,643 entitled "Multiple Object Processing in Wide-Angle Video Camera," (which is hereby incorporated by reference in its entirety), Ser. No. 60/467,588 entitled "Multiple View Processing in Wide-Angle Video Camera," (which is hereby incorporated by reference in its entirety), Ser. No. 60/467,644 entitled "Method of simultaneously displaying multiple views for Video Surveillance," (which is hereby incorporated by reference in its entirety), and Ser. No. 60/467,705 entitled "Correction of optical distortion by image processing," (which is hereby incorporated by reference in its entirety), and the U.S. Provisional Patent Application 60/553,186, entitled "Wide angle electronic camera with improved peripheral vision," (which is hereby incorporated by reference in its entirety), describe procedures to correct the distorted view obtained by a wide angle camera. Rots can be marked on these corrected view videos. Marked RoIs can be mapped onto the original image obtained by the wide-angle camera by the optical ray tracing and according to the property of the lens used in imaging. It is wiser to store the original video image frames produced by the camera instead of the view corrected videos obtained by image processing because the view corrected images can be always generated from the original images by image processing as described by the U.S. Patent Application Ser. No. 60/467,705 (which is hereby incorporated by reference in its entirety).

Another RoI in a wide angle video is shown in FIG. 12. In this case, RoI is determined according to the criterion that some objects may be left (or removed) in some part of the room.

If an alpha-degree lens is used instead of a 180 degree lens for imaging then the image obtained on the planar imaging array is also distorted according to the lens characteristic (if the lens is a narrow angle uniform lens then the lens surface is almost planar and the image formed on the planar imaging array appears as distortion free because of the almost planar nature of the lens surface). Therefore, the nature of the distortion in the images obtained by the camera due to the material used in the lens and the angle of the lens can be determined by tracing light rays. Concept of ray tracing is illustrated in FIG. 9 for a uniform 180 degree lens. Images of corners of the room marked as A and B, respectively appear on the digital imaging array (100) of the camera (10) as A' and B', respectively. The image of the center C of the room appears as C' on the imaging array (100). Similarly, given a distortion corrected image the actual image formed by the imaging array of the camera can be computed. So, RoIs marked on the distortion corrected image can be easily determined on the actual image frames of the video.

This approach leads to efficient wide-angle video coding results because a wide-angle video may contain sky or moving trees in an open air screening application and it may contain floor or ceiling pixels in an indoor surveillance application. Such non-RoI regions contain no useful semantic information and as little bits as possible should be assigned to such regions. The transform domain coefficients corresponding to such regions should be quantized in a coarse manner so that the number of bits assigned to such regions is less than the finely quantized RoIs. Also, moving clouds or moving trees or moving clock arms can be encoded in an interframe manner to achieve high data compression ratios. Possible mistakes due to interframe motion prediction will not be important in non-RoI regions. Although the effective intraframe compression increases the bit rate in RoI regions, the encoded bitstream of the present invention, in general, requires less space than a uniformly compressed wide angle video because of spatial and temporal flexibility in non-RoI regions which can be assigned significantly small number of bits compared to RoIs. In non-RoI portions of a wide-angle video there is very little motion in general. Therefore, pixels in a non-RoI portion of an image frame at time instant n is highly correlated with the corresponding pixels at image frame at time instant n+1. Such regions can be very effectively compressed by computing the transform of the difference between the corresponding blocks. The present invention which has a differential encoding scheme at non-RoI portions of the video takes advantage of this fact and drastically reduces the number of bits assigned to such regions containing very little semantic information.

Another example feature of some embodiments of the present invention is its robustness to transmission channel congestion problem from the point of view of useful information representation. An ordinary video encoder uniformly increases the quantization levels over the entire image to reduce the amount of transmitted bits when there is a buffer overflow or transmission channel congestion problem. On the other hand, this may produce degradation even the loss of very important information in RoIs in wide angle surveillance videos. Some embodiments of the present invention first increases the quantization levels in non-RoI regions of the video. If the channel congestion gets worse then, it throws away the AC coefficients of the non-RoI blocks and represents them using only their DC coefficients. As a final resort, almost no information about the non-RoI information can be sent. If this bit rate reduction is not enough then the method and the system increases the quantization levels of the RoI blocks as a last choice. In other words, essential information in RoIs of the image is kept as accurate as possible in the case of a buffer overflow or channel congestion.

The disclosed invention differs from other methods of RoI selection because the key RoI selection criterion is to increase the quality of representation of the RoI in the compressed data domain.

What is claimed is:

1. A method of intelligently compressing a stream of wide angle video images by applying varying compression methodology to selected regions of interest (RoI), comprising the steps of:
   using a detection algorithm for determining a plurality of regions of interest in an image frame of the video,
   encoding the regions of interest of video using only intra-frame information by computing a linear transform of the image pixels to generate transform domain coefficients, quantizing the transform domain coefficients and representing the quantized coefficients in binary form,
   compressing the exterior regions of interest using plurality of image frames of the video, and
   combining said compressed exterior regions of interest with said encoded regions of interest to create a bitstream representing the plurality of image frames of the video.

2. The method of claim 1 in which said detection algorithm is a human detection algorithm in wide angle video.

3. The method of claim 1 in which said detection algorithm is implemented on the view corrected video.

4. The method of claim 1 in which the linear transformation used in compresion includes wavelet and the discrete cosine transforms.

5. The method of clim 1 in which the quantized transform domain coefficients are encoded in binary form using coding selected from the group consisting of: Huffman coding and arthmetic coding.

6. The method of claim 1 in which said regions of interest are compressed by using intraframe information by canceling the motion estimation and the camera motion compensation process in differentially compressed video data.

7. The method of claim 1 in which differential video data compression methods include a compression standard selected from the group consisting of: MPEG-2 video compression and MPEG-4 video compression.

8. The method of claim 1 in which said regions of interest in the video are also determined manually by a user.

9. The method of claim 1 in which said regions of interest are determined on the view corrected video.

10. The method of claim 1 in which no side information describing regions of interest is transmitted to the encoder.

11. A computer readable medium containing programming instructions for intelligently compressing stream of video image frames by applying varying compressions methodology to selected regions of interest (RoI), comprising the steps of
   using a detection algorithm for determining a plurality of regions of interest in an image frame of the video,
   encoding the regions of interest of video using only intra-frame information by computing a linear transform of the image pixels to generate transform domain coefficients, quantizing the transform domain coefficients using lower quantization steps for transform domain coefficients and representing the said quantized coefficients in binary form,
   compressing the exterior of regions of interests using a plurality of image framed of the video, and
   combining the compressed exterior of RoIs with encoded RoIs to create a bitstream representing the plurality of image frames of the video.

12. The computer-readable medium of claim 11 in which the detection algorithm is a human detection algorithm in wide angle video.

13. The computer-readable medium of claim 11 in which said detection algorithm is implemented on the view corrected video.

14. The computer-readable medium of claim 11, wherein the linear transform is selected from the group consisting of the Discrete Cosine Transform and a wavelet transform.

15. The computer-readable medium of claim 11, wherein the quantized transform domain coefficients are encoded in binary form using coding selected from the group of Huffman coding and arithmetic coding.

16. The computer-readable medium of claim 11, in which said regions of interest are compressed by using intraframe information by cancelling the motion estimation and the camera compensation process in differentially compressed video data.

17. The computer-readable medium of claim 11 in which video data compression methods used are selected from the group consisting of MPEG-2 and MPEG-4 video compression standards.

18. The computer-readable medium of claim 11 in which said regions of interests in the video are also determined manually by a user.

19. The computer-readable medium of claim 11 in which said regions of interest are determined on the view corrected video.

20. The computer-readable medium of claim 11 in which no side information describing said Regions of Interest is transmitted to the encoder.

* * * * *